United States Patent
Stolski

(10) Patent No.: US 7,363,251 B2
(45) Date of Patent: Apr. 22, 2008

(54) DEDICATED PORTABLE COMPUTER SALES PRESENTATION SYSTEM

(76) Inventor: Sean M. Stolski, 16030 Iguana St. NW., Ramsey, MN (US) 55303

( * ) Notice: Subject to any disclaimer, the term of this patent is extended or adjusted under 35 U.S.C. 154(b) by 1021 days.

(21) Appl. No.: 10/119,357

(22) Filed: Apr. 8, 2002

(65) Prior Publication Data

US 2003/0191697 A1 Oct. 9, 2003

(51) Int. Cl.
*G06Q 30/00* (2006.01)
(52) U.S. Cl. ....................................................... 705/26
(58) Field of Classification Search .................. 705/26
See application file for complete search history.

(56) References Cited

U.S. PATENT DOCUMENTS

| 5,958,058 | A | * | 9/1999 | Barrus ........................ 713/320 |
| 6,125,356 | A | * | 9/2000 | Brockman et al. ............ 705/37 |
| 2002/0032784 | A1 | * | 3/2002 | Darago et al. .............. 709/229 |
| 2004/0205712 | A1 | * | 10/2004 | Holzle et al. ............... 717/118 |

FOREIGN PATENT DOCUMENTS

WO   WO 00/39718   *   7/2000

OTHER PUBLICATIONS

Poley, Have You Tried "User Friendly" Interviews? IS. Insurance Sales.Indianapolis: Aug. 1984. vol. 127, Iss.8; p. 8. downloaded from ProQuest on the Internet on Apr. 6, 2007, 1 page.*

* cited by examiner

*Primary Examiner*—James Zurita

(57) ABSTRACT

A dedicated portable computer sales presentation system for efficiently making a multimedia sales presentation at the location of a customer. The dedicated portable computer sales presentation system includes installing the required sales presentation files upon a hard drive of the portable computer system, blocking access to the Internet from the portable computer system and removing a media player from the portable computer system to allow the portable computer system to only be utilized for making a multimedia sales presentation to the customer. When the sales agent meets with a customer, the agent calls the company and answers a series of introduction questions relating to the customer and the call is terminated with the company recording the end time of the call as the start time of the sales presentation. The multimedia sales presentation (which may include a virtual tour run from the hard drive) is made upon the portable computer system and if a sale is made the necessary contract is printed for the customer to sign. The sales agent then shuts down the portable computer system and then calls the company to answer closing questions where after the call is terminated with the company recording the start time of the call as the end time of the sales presentation.

1 Claim, 4 Drawing Sheets

DEDICATED PORTABLE COMPUTER SALES PRESENTATION SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to computer devices and more specifically it relates to a dedicated portable computer sales presentation system for efficiently making a multimedia sales presentation at the location of a customer.

2. Description of the Related Art

Companies that make sales presentations for goods/services, such as vacation ownership property (e.g. timeshare), often times are forced to invite the potential customer to the site of the goods/services offered. To attract and encourage potential customers to travel a relatively significant distance, the company must offer incentives such as free gifts, money, free airfare, discounts and other incentives that are attractive to potential customers. Companies are aware that each industry has a "sales percentage" which is simply the number of sales made divided by the total number of sales presentations made. For example, some industries have a 10% sales percentage which requires the sales agent on average to make 10 sales presentations for each sale made. It is therefore extremely important for the sales agent to make as many sales presentations as possible during a given period of time to maximize the total number of sales for the company. In addition, based upon the sales percentage the company is limited by a financial threshold for offering incentives to potential customers. For example, if one sale nets a company $10,000 and the sales percentage is 10%, the maximum incentive per customer the company would be able to offer is $1,000 without having a negative net profit. Since a company needs to make a profit, the actual value of the incentive must be lower than the threshold.

The main problem with conventional sales presentation systems is that they are expensive to employ because of the incentives required to lure potential customers to the site of the company. Another problem with conventional sales presentation systems is that they are time consuming and not an efficient method of making a large number of sales presentations in a finite period of time. Another problem with conventional sales presentation systems is that they require the customer to travel a significant distance which is not desirable for the customer even with incentives. A further problem with conventional sales presentation systems is that the "incentives" typically have to increase over time as customers become overwhelmed with sales offers by numerous other companies.

While these sales presentation systems may be suitable for the particular purpose to which they address, they are not as suitable for efficiently making a multimedia sales presentation at the location of a customer. Conventional sales presentation systems require the potential customer to visit the site of the company and also typically require costly incentives provided by the company.

In these respects, the dedicated portable computer sales presentation system according to the present invention substantially departs from the conventional concepts and designs of the prior art, and in so doing provides a system primarily developed for the purpose of efficiently making a multimedia sales presentation at the location of a customer.

BRIEF SUMMARY OF THE INVENTION

In view of the foregoing disadvantages inherent in the known types of marketing techniques now present in the prior art, the present invention provides a new dedicated portable computer sales presentation system wherein the same can be utilized for efficiently making a multimedia sales presentation at the location of a customer.

The general purpose of the present invention, which will be described subsequently in greater detail, is to provide a new dedicated portable computer sales presentation system that has many of the advantages of the marketing techniques mentioned heretofore and many novel features that result in a new dedicated portable computer sales presentation system which is not anticipated, rendered obvious, suggested, or even implied by any of the prior art marketing techniques, either alone or in any combination thereof.

To attain this, the present invention generally comprises installing the required sales presentation files upon a hard drive of the portable computer system, blocking access to the Internet from the portable computer system and removing a media player from the portable computer system to allow the portable computer system to only be utilized for making a multimedia sales presentation to the customer. When the sales agent meets with a customer, the agent calls the company and answers a series of introduction questions relating to the customer and the call is terminated with the company recording the end time of the call as the start time of the sales presentation. The multimedia sales presentation is made upon the portable computer system and if a sale is made the necessary contract is printed for the customer to sign. The sales agent then shuts down the portable computer system and then calls the company to answer closing questions where after the call is terminated with the company recording the start time of the call as the end time of the sales presentation.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a dedicated portable computer sales presentation system that will overcome the shortcomings of the prior art systems.

A second object is to provide a dedicated portable computer sales presentation system for efficiently making a multimedia sales presentation at a location convenient for the customer such as the customer's home or place of business.

A further object is to provide a dedicated portable computer sales presentation system that increases the financial productivity from sales agents.

Another object is to provide a dedicated portable computer sales presentation system that makes a sales presentation without actually having the customer visit the goods or services being marketed.

Another object is to provide a dedicated portable computer sales presentation system that reduces the amount of time the sales agent might waste on non-sales related activities with a portable computer and that increases the amount of time the sales agent spends making sales presentations.

Another object is to provide a dedicated portable computer sales presentation system that reduces abuse of the portable computer by a sales agent.

An additional object is to provide a dedicated portable computer sales presentation system that reduces the likelihood of data/software theft by agents.

A further object is to provide a dedicated portable computer sales presentation system that reduces the overhead of a company by eliminating the need for Internet access.

Another object is to provide a dedicated portable computer sales presentation system that does not allow Internet access to web sites or e-mail.

A further object is to provide a dedicated portable computer sales presentation system that is affordable to produce and that can be easily duplicated and repaired.

Another object is to provide a dedicated portable computer sales presentation system that is not likely to be damaged (deliberately or accidentally) by a sales agent.

A further object is to provide a dedicated portable computer sales presentation system that is capable of making sales presentations for various types of goods and services.

Another object is to provide a dedicated portable computer sales presentation system that does not allow a sales agent to install computer operable programs.

A further object is to provide a dedicated portable computer sales presentation system with enhanced performance because no power management settings are used and all multimedia files are stored upon and read from the hard drive.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

1. Introduction

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a portable computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

2. Portable Computer System

Figure 1:
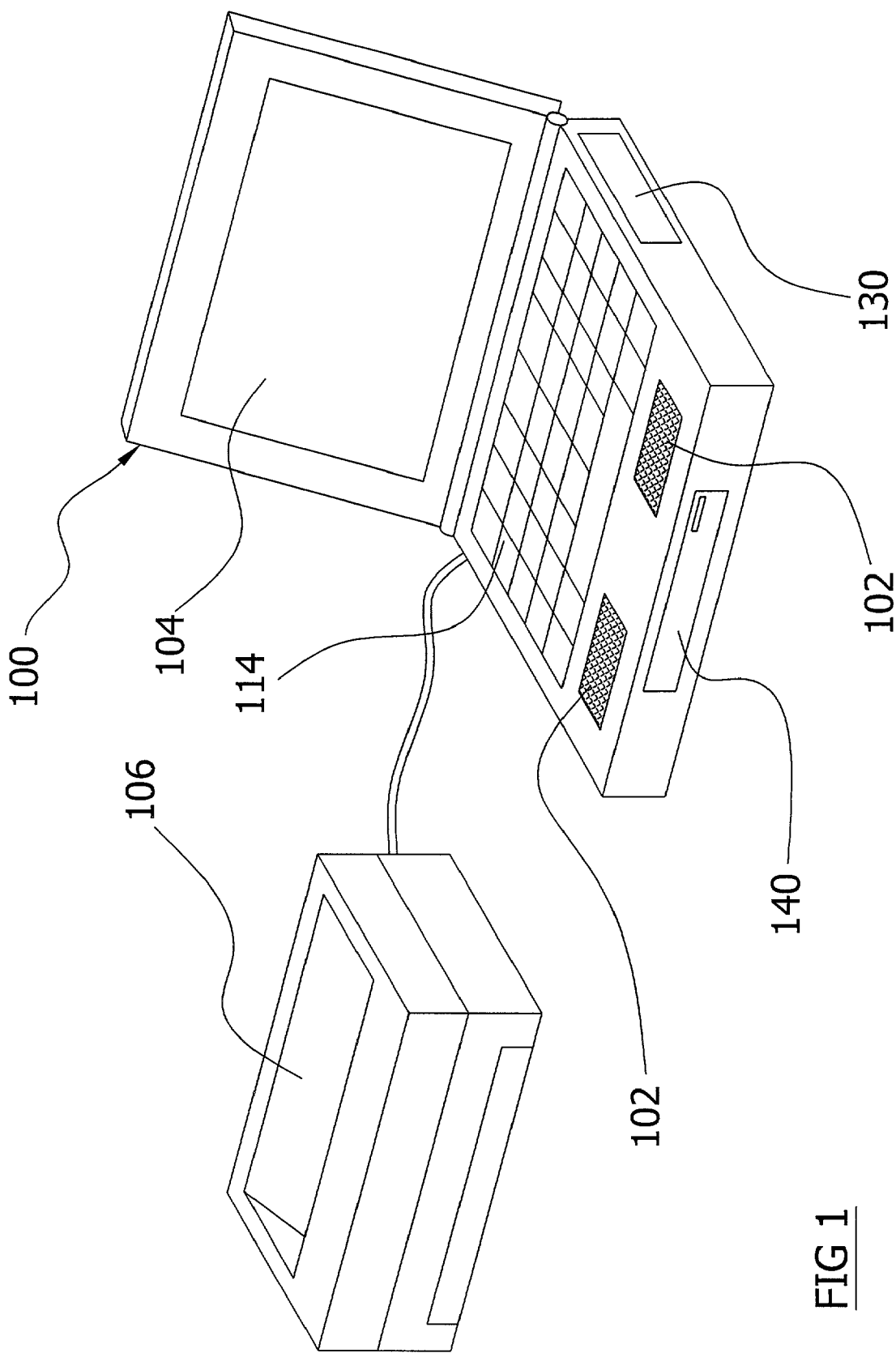
FIG. 1 is an upper perspective view of the present invention.
Figure 2:
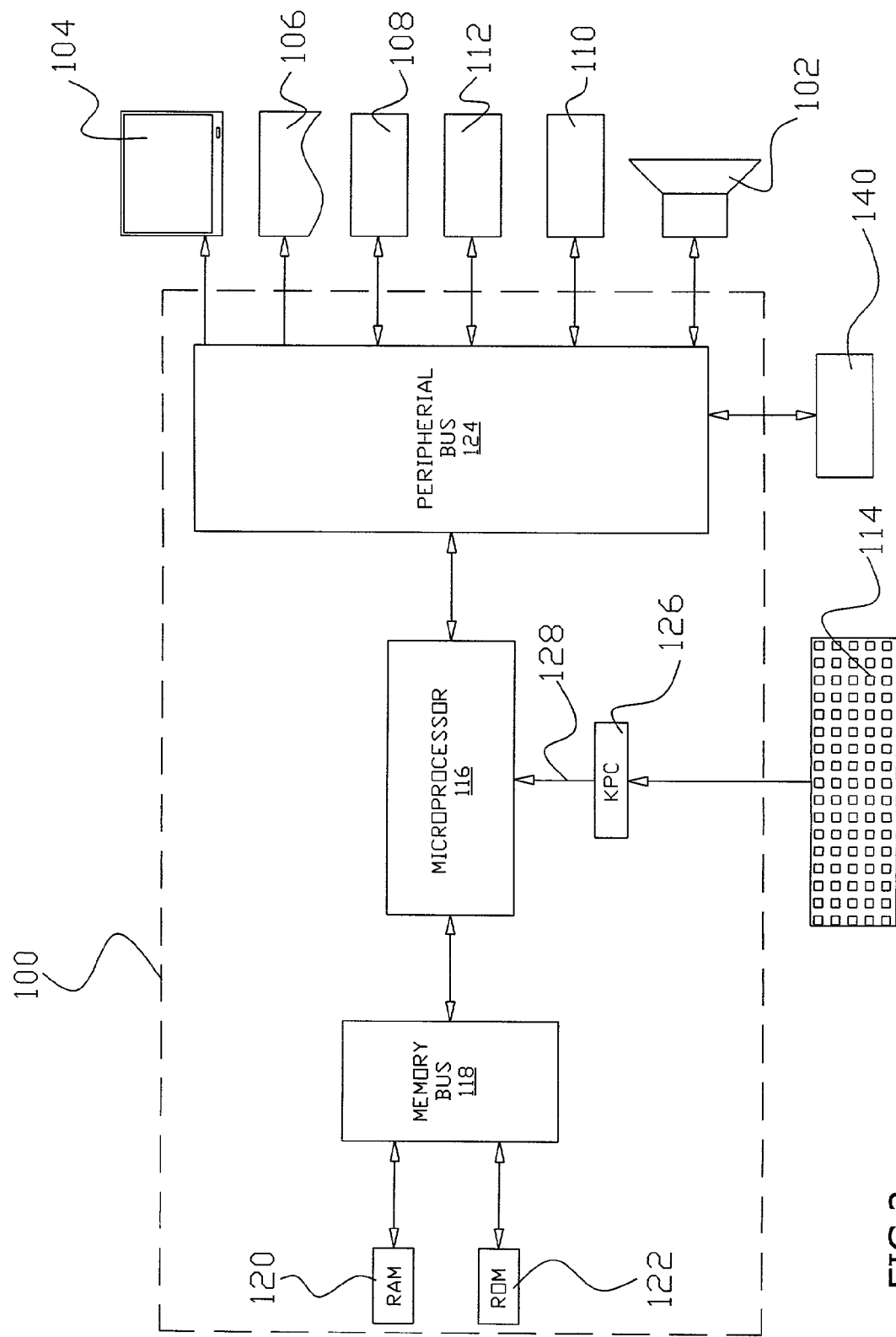
FIG. 2 is a block diagram of an exemplary portable computer system.
Figure 3:
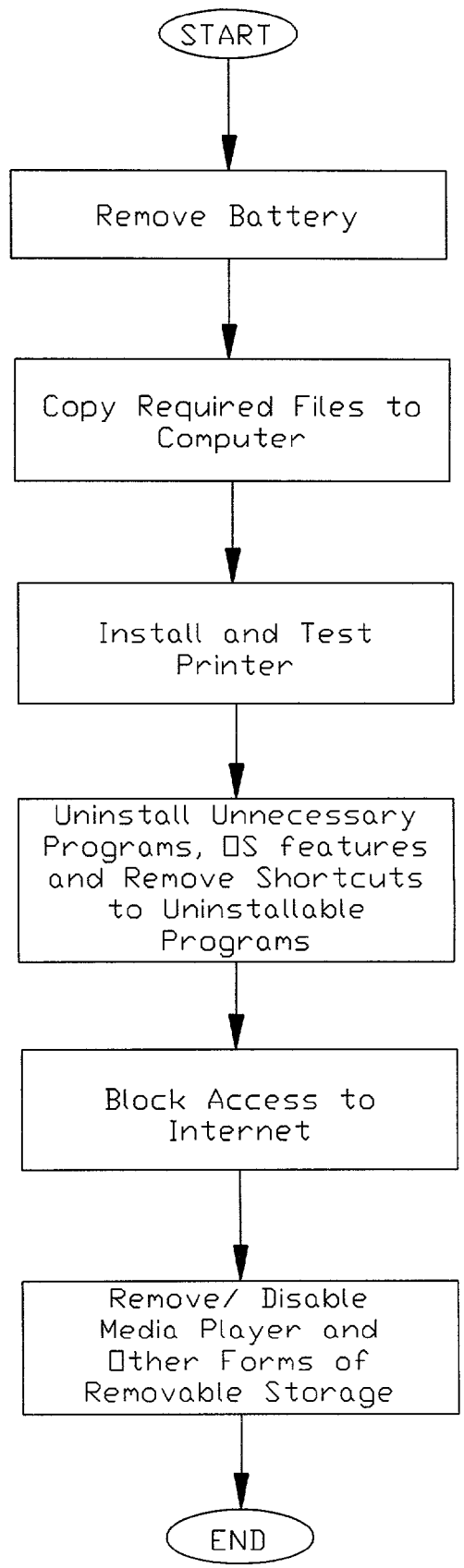
FIG. 3 is a flowchart illustrating the configuration of the portable computer system.

FIG. 2 is a block diagram of an exemplary portable computer system 100 for practicing the various aspects of the present invention. The portable computer system 100 includes a display screen 104, a printer 106, a floppy disk drive 108, a hard disk drive 110, a media player (e.g. CD-ROM, DVD) 140, a network interface 112, and a keyboard 114. The portable computer system 100 includes a microprocessor 116, a memory bus 118, random access memory (RAM) 120, read only memory (ROM) 122, a peripheral bus 124, and a keyboard controller 126. The portable computer system 100 is preferably comprised of a compact structure such as laptop and notebook computers manufactured by companies like APPLE computer, an IBM computer, or one of the compatibles thereof.

The microprocessor 116 is a general-purpose digital processor that controls the operation of the portable computer system 100. Microprocessor 116 can be a single-chip processor or implemented with multiple components. Using instructions retrieved from memory, microprocessor 116 controls the reception and manipulations of input data and the output and display of data on output devices.

The memory bus 118 is utilized by the microprocessor 116 to access the RAM 120 and the ROM 122. RAM 120 is used by microprocessor 116 as a general storage area and as scratch-pad memory, and can also be used to store input data and processed data. ROM 122 can be used to store instructions or program code followed by microprocessor 116 as well as other data.

Peripheral bus 124 is used to access the input, output and storage devices used by the portable computer system 100. In the described embodiment(s), these devices include a display screen 104, a printer device 106, a floppy disk drive 108, a hard disk drive 110, and a network interface 112. A keyboard controller 126 is used to receive input from the keyboard 114 and send decoded symbols for each pressed key to microprocessor 116 over bus 128.

The display screen 104 is an output device that displays images of data provided by the microprocessor 116 via the peripheral bus 124 or provided by other components in the portable computer system 100. The display screen 104 may be comprised of a flat-panel active matrix, passive matrix or other suitable display. The printer device 106 when operating as a printer provides an image on a sheet of paper or a similar surface. Other output devices such as a plotter, typesetter, etc. can be utilized in place of, or in addition to, the printer device 106.

The floppy disk drive 108 and the hard disk drive 110 can be utilized to store various types of data. The floppy disk drive 108 facilitates transporting such data to other portable computer systems, and the hard disk drive 110 permits fast access to large amounts of stored data.

The microprocessor 116 together with an operating system operate to execute computer code and produce and use data. The computer code and data may reside on RAM 120, ROM 122, or hard disk drive 110.

The network interface circuit 112 is utilized to send and receive data over a network connected to other portable computer systems. An interface card or similar device and appropriate software implemented by microprocessor 116 can be utilized to connect the portable computer system 100 to an existing network and transfer data according to standard protocols.

The keyboard 114 is used by a user to input commands and other instructions to the portable computer system 100. Other types of user input devices can also be used in conjunction with the present invention. For example, pointing devices such as a computer mouse, a track ball, a stylus, or a tablet to manipulate a pointer on a screen of the portable computer system 100.

3. Configuring the Computer System 100

The computer system 100 is initially setup by the company prior to providing to the sales agent. If the computer system 100 was manufactured with a battery 130, the company removes the battery 130 and sets the power settings to operate directly from AC power thereby improving the overall performance of the computer system 100.

The company then installs the required sales presentation files upon the hard drive 110 of the portable computer system 100. Required sales presentation files include but are not limited to data files and software programs. Data files include multimedia files to be presented to the customer which may include video and/or audio. The multimedia files may be comprised of various well-known file formats readable by a multimedia program. The data files further include any contract documents that may be required to make a sale with a customer. Additionally, a virtual tour may be installed and run from the hard drive only. It is viewed with a browser, such as NETSCAPE or NETSCAPE COMMUNICATOR.

The software programs installed upon the computer system 100 include multimedia programs that are capable of playing the multimedia files such as WINDOWS MEDIA PLAYER or other multimedia playing programs. Additional software programs may be installed to allow for the loading, editing and printing of a contract such as MICROSOFT WORDPAD, similar text editing programs, or word processors. In addition, software programs utilized to limit the access and usage of the computer system 100 for sales presentations are preferably utilized such as NORTON INTERNET SECURITY, ZONE ALARM or other Internet blocking programs.

After the data and software program files have been installed upon the computer system 100, the company then installs and tests the printer 106. The required drivers are preferably transferred during the copying of files step of the computer configuration process, but may be installed later during the configuration process. A test page is preferably printed to ensure that the printer 106 is fully operational.

The company then uninstalls any unnecessary software programs, files and OS features from the computer system 100 that are not required to make the multimedia presentation. Programs such as games, graphical editors and other programs are removed from the computer system 100 to prevent the sales agent from spending time on non-sales orientated matters. In addition to removing software programs, all shortcuts are removed to uninstallable programs such as MICROSOFT INTERNET EXPLORER.

The company then blocks all access to the Internet from the portable computer system by first turning off or removing the modem and/or network interface 112. The Internet blocking software is then adjusted to ensure that software programs like MICROSOFT INTERNET EXPLORER, NETSCAPE, NETSCAPE COMPOSER or MICROSOFT OUTLOOK cannot access the Internet.

The company then removes the media player 140 (e.g. CD-ROM, DVD player or floppy drive) from the portable computer system to allow the portable computer system to only be utilized for making a multimedia sales presentation to the customer based upon the data contained upon the hard drive. Instead of removing the media player 140, the user may simply "disable" the media player 140 utilizing the BIOS or similar method. Other security steps may be taken to ensure that the computer system 100 is only utilized for sale presentations and not for personal matters of the sales agent.

The computer system 100 is then checked to confirm that it is properly setup. After a proper setup has been confirmed, the company then provides the computer system 100 to the sales agent for usage with customers.

4. Operation of the Dedicated Portable Computer Sales Presentation System

Figure 4:
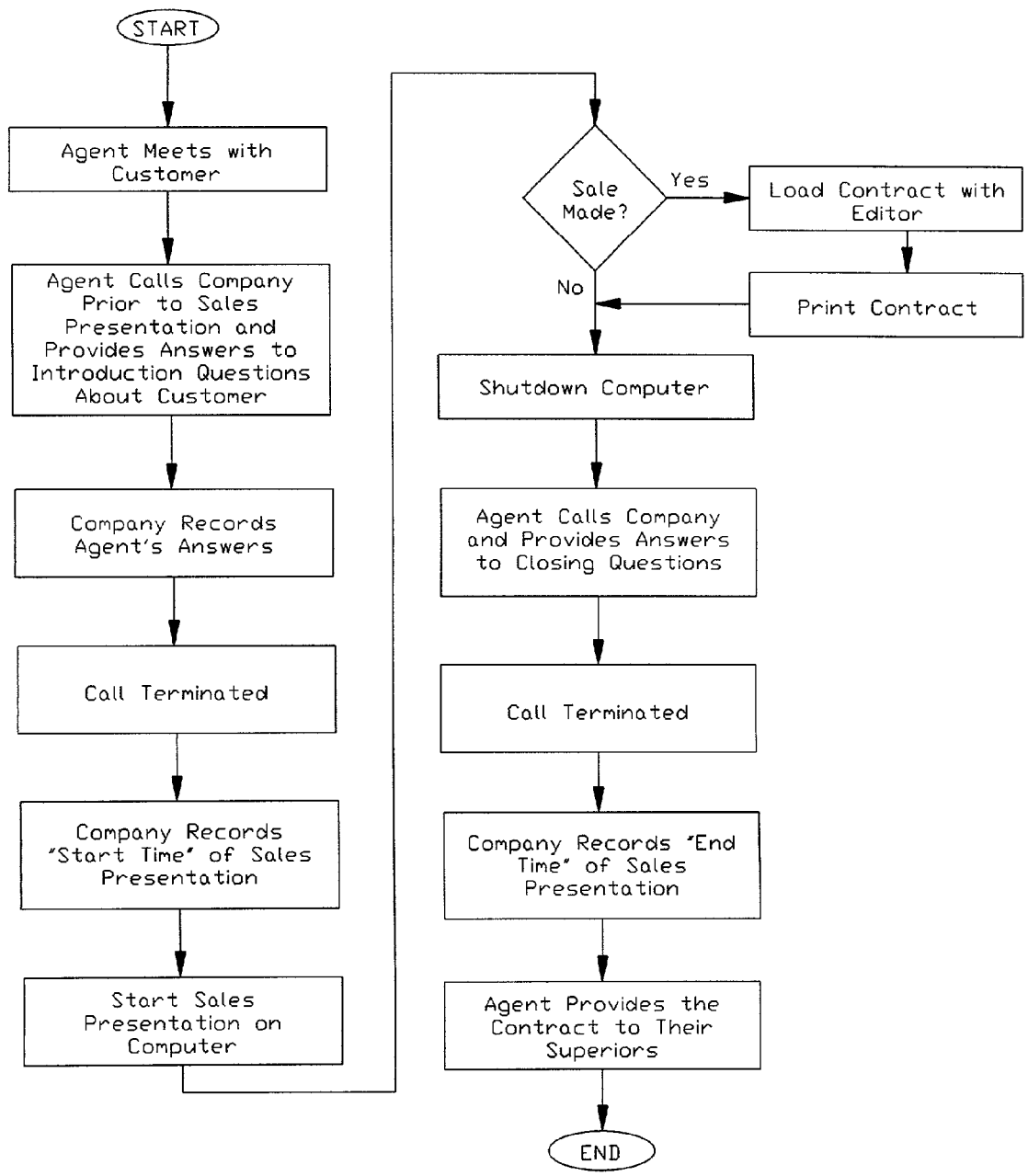
FIG. 4 is a flowchart illustrating the sales presentation process utilizing the portable computer system.

As shown in FIG. 4 of the drawings, when the sales agent meets with a customer, the agent calls the company and answers a series of introduction questions relating to the customer. Questions such as "What is the name of the customer?", "What is the address of the customer?" and "What is the social security number of the customer?" The answers provided by the sales agent may be utilized to perform a credit check upon the customer. The answers provided by the sales agent are also utilized to create a new database record which contains the sales agent's information along with the customer's identification.

The call is then terminated with the company and the company records the end time of the call as the "start time" of the sales presentation within the database. The multimedia sales presentation is then made upon the portable computer system 100 by loading the multimedia file which is played with the appropriate program upon the computer system 100. The customer views the sales presentation upon the display screen 104 of the computer system 100. It can be appreciated that the multimedia sales presentation may be continuous, interrupted with periodic printed materials or interactive with the customer participating within the multimedia presentation. The presentation may additionally include viewing a virtual tour, which is a web site or portion thereof, that displays pictures on the display 104. The tour is stored on the hard drive 110 and viewed with a browser, such as NETSCAPE.

At the end of the sales presentation, if a sale is made requiring a contract to be signed by the customer, the sales agent then loads the contract into a text editor such as MICROSOFT WORDPAD or MICROSOFT WORD. The sales agent enters the required information relating to the sale and then prints the contract for the customer to sign.

The sales agent then shuts down the portable computer system 100 after the execution of the contract or the end of the sales presentation. The sales agent then calls the company to answer a series of closing questions such as "Did you make a sale?", "How much was the transaction?" and "Did the customer sign the contract?". After the call is terminated with the company, the company records the start time of the call as the "end time" of the sales presentation within the database. The sales agent then may mail, hand-deliver or fax the executed contract to the company. The company may process a sale at this time or the agent may process it using a generic portable card reader.

The database records created by the company in monitoring the usage of the computer system 100 allows the company to verify and monitor each sales agent's performance and productivity. The company can thereby determine whether a particular sales agent is effectively utilizing their time in making sales presentations. Benefits and incentives may be offered to the sales agents based upon this data. The company may also verify the data within the database by checking the time of phone records since the sales agent will call the company via a toll-free number.

As to a further discussion of the manner of usage and operation of the present invention, the same should be apparent from the above description. Accordingly, no further discussion relating to the manner of usage and operation will be provided.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

| Index of Elements for Dedicated Portable Computer Sales Presentation System | | | | |
|---|---|---|---|---|
| ☐ | 100. | Computer System | ☐ | 140. Media Player |
| ☐ | 101. | | ☐ | |
| ☐ | 102. | Speaker | ☐ | |
| ☐ | 103. | | ☐ | |
| ☐ | 104. | Display Screen | ☐ | |
| ☐ | 105. | | ☐ | |
| ☐ | 106. | Printer | ☐ | |
| ☐ | 107. | | ☐ | |
| ☐ | 108. | Floppy Disk Drive | ☐ | |
| ☐ | 109. | | ☐ | |
| ☐ | 110. | Hard Disk Drive | ☐ | |
| ☐ | 111. | | ☐ | |
| ☐ | 112. | Network Interface | ☐ | |
| ☐ | 113. | | ☐ | |

| Index of Elements for Dedicated Portable Computer Sales Presentation System -continued | | | |
|---|---|---|---|
| ☐ | 114. | Keyboard | ☐ |
| ☐ | 115. | | ☐ |
| ☐ | 116. | Microprocessor | ☐ |
| ☐ | 117. | | ☐ |
| ☐ | 118. | Memory Bus | ☐ |
| ☐ | 119. | | ☐ |
| ☐ | 120. | RAM | ☐ |
| ☐ | 121. | | ☐ |
| ☐ | 122. | ROM | ☐ |
| ☐ | 123. | | ☐ |
| ☐ | 124. | Peripheral Bus | ☐ |
| ☐ | 125. | | ☐ |
| ☐ | 126. | Keyboard Controller | ☐ |
| ☐ | 127. | | ☐ |
| ☐ | 128. | Bus | ☐ |
| ☐ | 129. | | ☐ |
| ☐ | 130. | Battery | ☐ |
| ☐ | 131. | | ☐ |
| ☐ | 132. | | ☐ |
| ☐ | 133. | | ☐ |
| ☐ | 134. | | ☐ |
| ☐ | 135. | | ☐ |
| ☐ | 136. | | ☐ |
| ☐ | 137. | | ☐ |
| ☐ | 138. | | ☐ |
| ☐ | 139. | | ☐ |

I claim:

1. A method of producing a dedicated sales presentation portable computer, comprising the steps of:
    (a) first removing a battery from a portable computer, wherein said battery provides a main source of power to said portable computer;
    (b) second adjusting power settings upon said portable computer to operate on AC power;
    (c) third copying required files to a hard drive of said portable computer essential to make a multimedia sales presentation, wherein said required files include sales presentation files;
    (d) fourth installing a virtual tour upon said portable computer to be run upon said hard drive;
    (e) fifth installing a printer to be utilized with said portable computer;
    (f) sixth testing said printer by printing a test page;
    (g) seventh uninstalling software programs from said portable computer not required to make said multimedia sales presentation;
    (h) eighth removing shortcuts to programs and OS features from said portable computer not utilized to make said multimedia sales presentation;
    (i) ninth blocking access to the internet;
    (j) then disabling all hardware media players except said hard drive;
    (k) next confirming said portable computer is properly setup;
    (l) next providing said portable computer to a sales agent;
    (m) next meeting with a customer by said sales agent:
    (n) next calling a company for a first conversation;
    (o) then answering a series of introduction questions;
    (p) then entering answers to said introduction questions in a database;
    (q) then terminating said first conversation with said company;
    (r) subsequently recording an ending time of said first conversation within said database as a presentation start time;
    (s) next presenting said multimedia sales presentation upon said portable computer;

(t) next loading a contract upon said portable computer;
(u) next editing said contract;
(v) next printing said contract;
(w) next shutting down said portable computer;
(x) next calling said company for a second conversation;
(y) subsequently recording a beginning time of said second conversation within said database as a presentation end time;
(z) then answering a series of closing questions;
(aa) then entering answers to said closing questions in said database;
(bb) then terminating said second conversation with said company; and
(cc) finally evaluating said sales agent.

* * * * *